No. 798,225. PATENTED AUG. 29, 1905.
F. H. STERLING.
TIRE FOR WHEELED VEHICLES.
APPLICATION FILED DEC. 6, 1904.
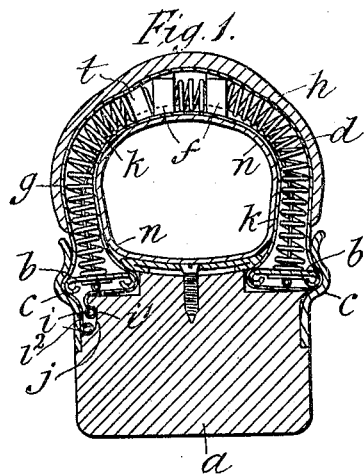
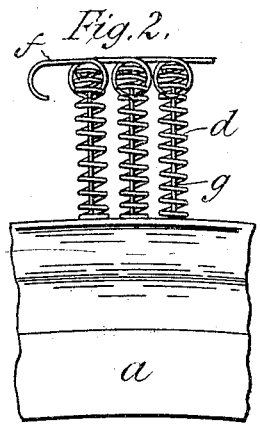
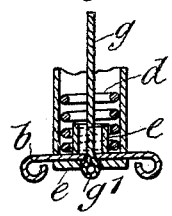
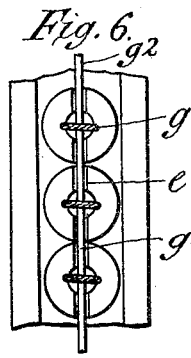
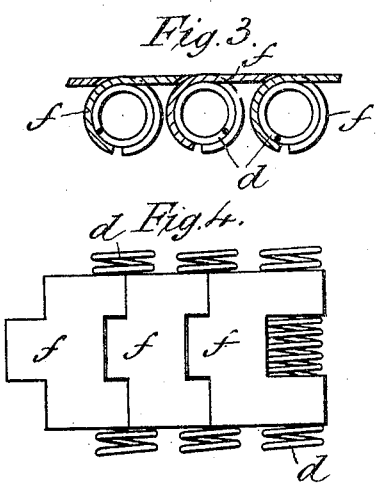
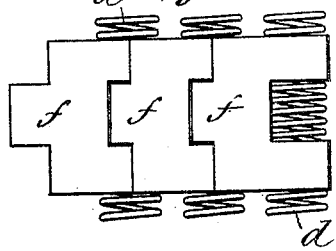
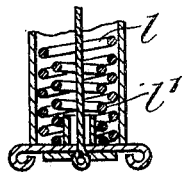
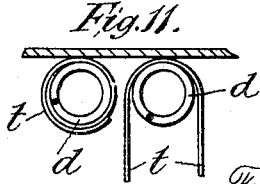
Witnesses:
Walter Allen
L. B. Middleton
Inventor
Frank H. Sterling
by Herbert W. T. Jenner
Attorney

UNITED STATES PATENT OFFICE.

FRANK HENRY STERLING, OF LONDON, ENGLAND.

TIRE FOR WHEELED VEHICLES.

No. 798,225.　　　　Specification of Letters Patent.　　　Patented Aug. 29, 1905.

Application filed December 6, 1904. Serial No. 235,754.

*To all whom it may concern:*

Be it known that I, FRANK HENRY STERLING, residing at 61 Spencer street, London, E. C., England, have invented certain new and useful Improvements in Tires for Wheeled Vehicles; and I do hereby declare the following to be a full, clear, and exact description of the invention, such as will enable others skilled in the art to which it appertains to make and use the same.

This invention relates to improvements in and connected with tires for wheeled vehicles, the object being to provide a spring-tire suitable for use in connection with motor-cycles and motor and other vehicles, the said tire preferably having an inner inflatable chamber after the manner of an ordinary pneumatic tire, but which may be dispensed with, and where such an inner inflatable chamber is employed means is provided for rendering the puncturing of the air-chamber by any ordinary means practically impossible.

In its essential features this improved tire comprises a rim or felly, across which a number of curved helical springs are arranged, the said springs either passing over the rim or felly at right angles thereto or they may be arranged diagonally, and these springs are connected together circumferentially around the wheel by an articulated shield formed of a number of links or clips and provided with a flexible tread.

Means are provided for securing the springs to the rim or felly in such a manner that they can be easily removed or replaced, as required. A suitable outer cover is provided, while the annular space around the wheel and beneath the curved springs may contain an inflatable air-chamber.

In order that this invention may be more fully understood, it will now be described with reference to the accompanying drawings, which illustrate a method of carrying the invention into practical effect, and in which—

Figure 1 is a cross-section of a tire constructed according to the invention. Fig. 2 is a partial detailed side view thereof. Fig. 3 is a side view showing the arrangement of the articulated shield or flexible tread whereby the springs are connected together, and Fig. 4 is a partial plan of Fig. 3. Fig. 5 is a detailed view illustrating the method of securing the extremities of the springs, and Fig. 6 is an under side plan of Fig. 5. Figs. 7 and 8 show in plan and cross-section the nipples employed in securing the extremities of the springs, and Figs. 9, 10, and 11 are detailed views hereinafter referred to.

As shown in the drawings, the rim or felly $a$ is formed at each side, with a groove or recess running around the periphery thereof, each groove or recess containing a preferably endless band or ring $b$, retained in position by the side flanges $c$, which may be bolted or suitably secured to the rim or felly $a$.

To the bands or rings $b$ are secured the extremities of a succession of curved helical springs $d$, this preferably being effected by passing nipples $e$ through holes or perforations in the rings or bands and fitting them tightly inside the end of the springs $d$, or obviously where the nipples are of sufficient diameter they might fit over the outsides of the end of the springs.

The whole of the springs are flexibly connected together circumferentially around the tire by means of clips, such as $f$, the curved arms of which embrace the springs, and these clips form an articulated shield along the tread of the tires and, further, serve to keep the springs a proper distance apart and to bring the working strain on more than one spring at a time without destroying its resiliency at any point or its power of giving or momentarily partially collapsing when passing over any obstruction. In some cases, particularly for heavy vehicles, the springs may be clipped or flexibly secured together in groups of two or more provided that the groups are in turn linked together so as to provide an unbroken flexible tread, and in order to prevent lateral movement of these clips they may be provided with small downwardly-projecting teeth designed to pass between the convolutions of the springs.

Through the springs a strand $g$ of wire or other suitable material is passed, the extremities of which are brought through the nipples at either side and formed into a loop $g'$, Fig. 6, where they are secured in position by means of wire $g^2$, passed through the said looped extremities, and this wire lies in the grooves $e'$, Fig. 6, of the nipples and may be formed in sections, each of such a length as to secure the extremities of any suitable number of strands. The object of these strands is to act as restrainers and prevent the springs unduly expanding and to a certain extent to prevent a broken spring from flying out and cutting the outer cover, and it will be seen that these strands are detachable independently of the springs, while any broken or damaged spring can be removed by slipping its extremities off the engaging nipples, when a fresh spring may be secured in position.

The restrainers may be formed of stranded wire, small flat springs, or chain, and I do not restrict myself to the exact method herein described of securing the extremities of the restrainers to or under the side bands or rings $b$, as there are obviously many methods of forming such a connection which admit of the strands being removed when required—as, for instance, by enlarging the extremities of the strands or securing small washers or the like thereto and after passing the extremities through the nipples slipping on above the enlarged extremities partially-slotted washers, the openings in which are of such a size as to prevent the enlarged extremities passing therethrough, or the extremities of the strands might be screw-threaded and the inner periphery of the top of the nipples sufficiently closed and screw-threaded to engage therewith. In the case of flat springs being employed as restrainers they might be secured by bending their extremities into loops and passing pins or wires through these looped extremities when in position, and in the case of chains being employed they might be secured by passing pins, rings, or the like through the end links when in position.

The outer cover $h$ is formed of canvas and rubber or of any other suitable material and in a manner which is well understood and is provided with a suitable tread and comprises, preferably, an endless strip of sufficient width to cover both the inner and outer surfaces of the springs. In each edge of the cover a wire $i$ is secured, or these edges may be enlarged or thickened in any suitable manner, and to secure the cover in position the inner edge $i'$ is placed in the annular groove $j$, which is formed around the side of the rim or felly $a$, and the inner flap $k$ of the cover then passes under the side band $b$ and around the inner surfaces of the springs, then under the second side band and the outer or tread portion $h$ over the outer surface of the springs, the outer extremity $i^2$ being then placed in the groove or recess $j$, where both edges are secured in position by means of the side flanges $c$.

The springs are preferably bent to nearly the required form and then hardened and tempered in that position, so that they have a tendency on one of the side flanges being removed to spring out, so as to admit of ready access being had to the interior of the tire, and instead of single springs being employed they may be compound, as indicated in Fig. 10—that is to say, they may consist of an outer spring $l$ and an inner spring $l'$ passing therethrough and preferably coiled in a reverse direction to the outer spring, while the convolutions of the springs may be formed much closer together at the part forming the tread portion, as indicated at $m$, Fig. 9.

The annular space around the rim and beneath the springs may contain the inflatable air-chamber $n$, and between the inner flap $k$ of the cover and the air-tube or the inner surfaces of the springs, or both, any suitable protecting strips or bands may be arranged, while in order to prevent any possibility of the outer cover "creeping" at the tread it may be secured to the springs by securely fastening to the under surface of the tread part a sufficient number of pairs of tapes or the like $t$, Figs. 1 and 11, which pass between the springs, each pair embracing one or more of them, and the extremities of these tapes or the like are then solutioned together or secured in any convenient and suitable manner.

Instead of forming the cover in one piece, as shown, it may be formed in two parts, one designed to cover the outer surface of the springs and the other the inner surface, both parts having wired or enlarged edges designed to be gripped between the side flanges and the rim or felly. In some cases the sides of the springs may be further protected by slipping over each end of the spring a sleeve of rubber or other suitable material of such a length as to extend along the side of the spring, or instead of a separate sleeve for the extremity of each spring a band of rubber or other suitable material of sufficient width and length may be provided, one at each side, and each band or strip would be furnished with a series of holes or perforations into which the ends of the springs would enter.

I wish it to be understood that I do not restrict myself to the exact method shown whereby springs $d$ are secured to the side bands $b$, as there are obviously many ways whereby this may be effected. As an example, the ends of the springs might be connected to nipples having oval or rectangular heads, while the bands $b$ would be formed with correspondingly-shaped holes or perforations, the nipples being arranged in the ends of the springs in such a manner that to pass the heads through the holes or perforations in the side bands it would be necessary to give a half-turn to the springs, so that when the heads were passed through the holes or perforations and the springs released the heads of the nipples would lie approximately across the holes or perforations at right angles to their length. Furthermore, the exact form of clip $f$ described and shown is not essential to the invention, as it might be modified in design and size so long as it connected the whole of the springs together to form a flexible suspension ring or tread around the circumference of the tire.

In order to prevent "wiping" or circumferential movement of the springs, one or more wires, chains, or the like may be employed, and in each case one extremity would be secured to one of the side bands, then carried up diagonally over the tire and secured approximately to the center of the tread and the free end carried down diagonally across the other side of the tire and secured on the opposite side thereof, and the wires, chains, or the like would preferably be arranged over the outer surface of the springs and under the outer cover.

Having now described my invention, what I claim as new, and desire to secure by Letters Patent, is—

1. The combination, with a wheel-rim, of a series of arches formed of helical springs having their end portions secured to the said rim, and a circumferential band formed of articulated plates or links and connected to the crown portions of the said arches.

2. The combination, with a wheel-rim, of a series of arches formed of helical springs having their end portions secured to the said rim, a circumferential band formed of articulated plates or links and connected to the crown portions of the said arches, and an inflatable air-tube arranged inside the said arches.

3. The combination, with a wheel-rim, of a series of arches formed of helical springs having their end portions secured to the said rim, and a series of flexible retaining-strands passed axially through the said springs and also having their ends secured to the rim.

4. The combination, with a wheel-rim, and two circumferential rings secured to its side portions and provided with holes; of a series of arches formed of helical springs, and fastening-nipples arranged in the said holes and having the end portions of the said springs secured to them.

5. The combination, with a wheel-rim, of a series of arches formed of helical springs having their end portions secured to the said wheel-rim, a circumferential band formed of articulated plates or links connected to the crown portions of the said arches, and a series of flexible retaining-strands passed axially through the said springs and also having their ends secured to the rim.

6. The combination, with a wheel-rim having circumferential grooves at the side portions of its periphery, of rings arranged in the said grooves, retaining-plates secured to the sides of the said rim and securing the said rings in the said grooves, and a series of arches formed of helical springs and having their end portions secured to the said rings.

In testimony whereof I affix my signature in presence of two witnesses.

FRANK HENRY STERLING.

Witnesses:
A. M. FORMAN,
GODFREY B. SHEPHERD.